United States Patent
Janajreh

[19]

[11] Patent Number: 6,109,316
[45] Date of Patent: Aug. 29, 2000

[54] TIRE HAVING IMPROVED TREAD PORTION FOR REDUCING FORMATION OF ANOMALIES CAUSING USER DISSATISFACTION

[75] Inventor: Ibrahim Mustafa Janajreh, Fountain Inn, S.C.

[73] Assignee: Michelin Recherche et Technique S.A., Switzerland

[21] Appl. No.: 09/185,445

[22] Filed: Oct. 28, 1998

Related U.S. Application Data

[63] Continuation-in-part of application No. 09/013,248, Jan. 26, 1998, abandoned.

[51] Int. Cl.⁷ .............................. B60C 11/04; B60C 11/13; B60C 101/00
[52] U.S. Cl. ................ 152/209.16; 152/209.23; 152/209.27
[58] Field of Search ................ 152/209.16, 209.18, 152/209.23, 209.27, DIG. 3

[56] References Cited

U.S. PATENT DOCUMENTS

| | | | |
|---|---|---|---|
| 2,938,560 | 5/1960 | Wallace et al. | 152/209 |
| 3,482,616 | 12/1969 | French | 152/209 |
| 3,586,086 | 6/1971 | Boileau | 152/209 |
| 4,214,618 | 7/1980 | Takigawa et al. | 152/209 |
| 4,480,671 | 11/1984 | Giron | 152/209 |
| 4,724,878 | 2/1988 | Kabe | 152/209 R |
| 4,995,437 | 2/1991 | Enoki et al. | 152/209 |
| 5,010,936 | 4/1991 | Numata et al. | 152/209 |
| 5,720,831 | 2/1998 | Aoki et al. | 152/209 |
| 5,769,977 | 6/1998 | Masaoka . | |

FOREIGN PATENT DOCUMENTS

| | | |
|---|---|---|
| 1 546 594 | 5/1979 | France . |
| WO 92/02380 | 2/1992 | France . |
| 2-246806 | 10/1990 | Japan . |
| 3-7603 | 1/1991 | Japan . |
| 4-63704 | 2/1992 | Japan . |

*Primary Examiner*—Steven D. Maki
*Attorney, Agent, or Firm*—Martin Farrell; Alan A. Csontos

[57] ABSTRACT

The invention is directed to a shoulder construction of the tread area of pneumatic tires which provides increased stability and reduced wear. The shoulder construction comprises a decoupling rib having an outer surface arranged circumferentially about the tire on an outer edge of the tread portion. A shoulder rib, which also has an outer surface, is arranged inwardly of an adjacent the decoupling rib. A groove, which is defined by the inner and outer side faces of the decoupling rib and the shoulder rib, extends from its base radially beneath the outer surface of the decoupling rib first diagonally toward and then away from the central radial axis of the shoulder rib. The groove configures the inner and outer side faces of the decoupling and shoulder ribs in conforming image and forms an unsupported outer surface area on the shoulder rib. This construction, under nominal pressure and load at the foot portion, provides radial stress which is substantially equalized from an outer edge over a major portion of the outer surface of the shoulder rib and provides for a portion of the inner side surface of the decoupling rib and a portion of the outer side surface of the shoulder rib to move into mutual contact providing reduced wear and increased lateral stability of the shoulder rib.

11 Claims, 6 Drawing Sheets

TIRE HAVING IMPROVED TREAD PORTION FOR REDUCING FORMATION OF ANOMALIES CAUSING USER DISSATISFACTION

This application is a continuation-in-part of application Ser. No. 09/013,248 filed Jan. 26, 1998 now abandoned.

BACKGROUND OF THE INVENTION

The present invention relates to a vehicle tire. Specifically, the invention relates to a pneumatic vehicle tire having an improved tread portion that reduces the formation of anomalies causing subjective user dissatisfaction.

Tires, especially commercial vehicle tires sometimes have to be removed from service due to anomalies on the tread region and particularly the shoulder tread region. These anomalies are depressions in the tread rib or tread blocks forming the rib. The anomalies are generally caused by unequal radial stress distribution laterally across the rib or blocks. The highest stress concentration occurs at the outer edges of the rib or blocks. This high stress concentration at the edges and particularly the outer edges of the rib or blocks is known as the edge effect. The central portion of the rib or blocks experiences lower stress than the edges. As a result, the anomalies typically begin to form at the edges of the rib or blocks.

Once an anomaly forms at the edge of the rib or blocks, the anomaly will propagate to the remainder of the rib or blocks; and often to adjacent ribs or blocks. The propagation of the anomaly occurs quickly as the tire continues to roll.

The decision to remove a tire is subjective and may depend on the location of the tire on the truck/trailer combination. Generally, a driver can feel an anomaly on a steering tire by the ride of the vehicle. In that case, the driver pulls the tire when uncomfortable with the ride of the vehicle. However, if a tire having an anomaly is a drive tire or is located on the trailer, the driver may not sense any discomfort. The driver may, however, hear an increase in tire noise. If the driver does not sense discomfort or an increase in noise, the driver will pull the tire during a subsequent visual inspection of the vehicle.

The removal of a tire due to anomalies causing subjective user dissatisfaction is premature when considering the portions of the tire without the anomaly. The portions of the tire without the anomaly are capable of substantial additional service on the vehicle. Extending the time until the onset of an anomaly or decreasing the severity of the anomaly once found may extend the life of the tire. The extended life of the tire reduces the cost of purchase and installation of new tires. In the commercial trucking field, these potential cost savings are significant.

Accordingly it is an object of the present invention to provide an improved tread portion that reduces the formation of anomalies causing subjective user dissatisfaction.

It is a further object of the present invention to reduce or eliminate the high normal stress distribution at the lateral edges of a tread rib or blocks.

It is a further object of the present invention to more uniformly distribute the normal stress laterally across the tread rib or blocks.

It is a further object of the present invention to reduce the radial stiffness at a lateral edge of a tread rib or blocks.

It is a further object of the present invention to maintain the lateral rigidity of a tread rib or blocks while reducing the radial stiffness at the edge of the rib or blocks.

It is a further object of the invention to provide sequential radial and lateral support for the shoulder ribs or blocks.

It is a further object of the invention to provide an improved shoulder construction of the tread portion of a tire.

It is a further object of the invention to provide conforming image support structure for the shoulder ribs and blocks It is a further object of the present invention to provide a tread rib or block capable of resisting tearing or cracking during.

SUMMARY OF THE INVENTION

Accordingly, the invention provides a tire comprising a pair of beads, a carcass ply having ends anchored to respective ones of the beads, a belt ply extending circumferentially around the tire and disposed radially outward of the carcass ply, and a tread portion disposed radially outward of the belt ply.

The tread portion includes a first or a shoulder rib having a lateral outer side surface formed to have a positively tapered portion extending along a radially innermost extend of the rib, a negatively tapered portion extending radially outward from the outer portion of the positively tapered portion, and a straight portion extending radially from the outer extension of the negatively tapered portion to the outer surface.

A second or decoupling rib is formed adjacent the shoulder rib. The decoupling rib has a side surface facing the side surface of the shoulder rib which includes a negatively tapered portion extending along the radially innermost extent thereof, and a positively tapered portion interconnected with the outermost portion of the negatively tapered portion and extending radially outward therefrom. A groove of selected width is formed between the two side surfaces separating the ribs a desired distance. The width of the groove can be 1 mm to 2.5 mm. The width of the groove can progressively vary along a length of the groove. The base of the groove, at the radially inner extent of the positively and negatively tapered portions of the shoulder and decoupling ribs respectively, is positioned laterally and radially outward from an outer edge of the belt ply for providing additional strength for the base of the shoulder rib to prevent cracking.

The transition areas between the tapered portions and between the negative taper portion and the straight portion form arcuate angles, which also prevents cracking.

The radial outward height of the shoulder rib is greater, by up to 20% of its total height, than the outward height of the decoupling rib. This requires that the shoulder rib, on contact with the support surface under nominal operating conditions, be moved radially inward in order for an outer surface of the decoupling rib to be in contact with the support surface. In addition, under nominal inflation pressure and tire loading, the sidewalls of the tire in the footprint area are urged laterally outward. These radially inward and laterally outward movements deflect the opposed shoulders carrying the decoupling ribs laterally inwardly a distance sufficient to close the grooves and bring at least a portion of the tapered portions of the decoupling rib into contact with the tapered portions of the shoulder ribs and to further bring the outer surface of the decoupling rib in contact with the support surface. In this position the decoupling ribs provide lateral support and a degree of radial support for the shoulder ribs at the footprint; which stabilizes the shoulder rib's lateral edge reducing wear and the formation of anomalies.

BRIEF DESCRIPTION OF THE DRAWINGS

Other objects of the present invention will become apparent from the following description with reference to the accompanying drawings, wherein.

DETAILED DESCRIPTION OF THE PREFERRED EMBODIMENTS

This application uses numerous phrases and terms of art.

The phrase "mid-circumferential plane" refers to the plane passing through the center of the tread and being perpendicular to the axis of rotation of the tire.

The term "rib or blocks" refers to a rib of the tread portion which may be formed continuous about the circumference of the tire or which may be formed by a plurality of juxtaposed blocks arranged about the circumference of the tire. The specification, in all instances, when referring to rib or ribs refers to both the continuous structure and the block structure.

The term "radial" refers to the direction perpendicular to the axis of rotation of the tire.

The term "axial" refers to the direction parallel to the axis of rotation of the tire.

The term "lateral" refers to the direction along the tread of the tire going from one sidewall of the tire toward the other sidewall.

The term "groove" refers to an elongated void area in the tread that may extend circumferentially or laterally in a straight, curved of zig-zag manner.

The term "footprint" or "foot area" refers to that portion of the tread area engaged with a support surface.

The phrase "tread width" refers to the greatest axial distance across the crown or the portion of the tread in contact with a road surface, as measured from a footprint of the tire, when the tire is mounted on a rim, subjected to a load, and inflated to a pressure corresponding to the load. All of the other tire dimensions are measured when the tire is mounted on a rim and inflated to a given pressure, but not subjected to a load.

The phrase "tread height" refers to the radial extent, or height, of a rib of the tread portion of a tire.

The term "taper" is defined as progressively narrowing or widening in the radially outward direction the width of the rib. Thus, the phrase "negative taper" is defined as progressively widening of the rib in the radially outward direction and the phrase "positive taper" is defined as progressively narrowing of the rib in the radially outward direction.

Figure 2:
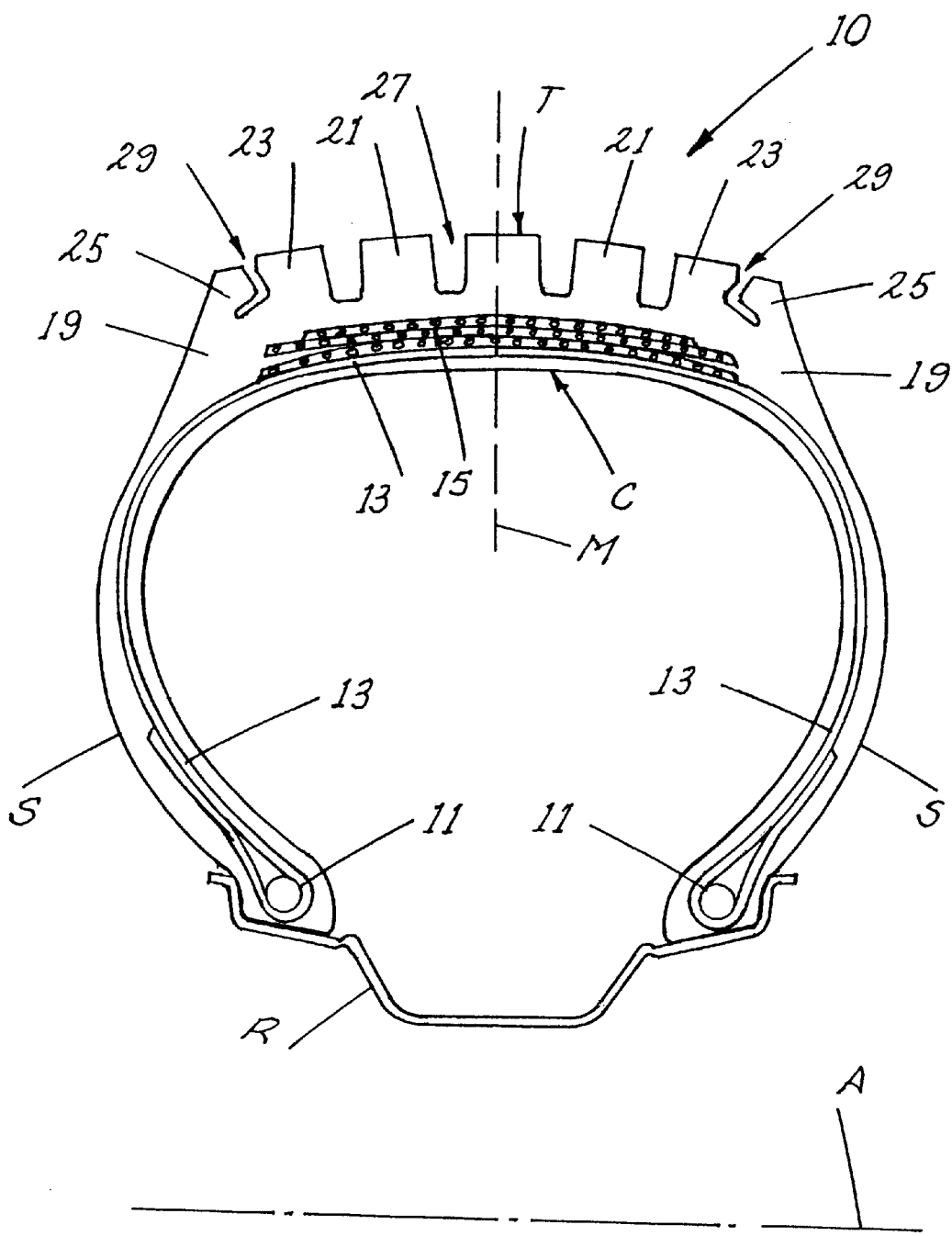
FIG. 2 is a cross-sectional view of the tire in FIG. 1.

The radial or normal pressure on the ribs of a conventional tire when contacting the supporting surface, is known to vary laterally across each rib. The normal pressure is greater at both lateral edges of each rib than it is in the center portion of each rib. This greater normal pressure accelerates wear along these edges. In addition, the most lateral ribs experience more wear that cause anomalies than the center ribs experience. As illustrated in FIG. 2, the shoulder rib 23 construction of this invention has a unique outermost lateral side surface configuration to undercut ribs 23 and reduce the accelerated wear producing the formation of anomalies formed along the lateral outer edges of the shoulder ribs. The side surface configuration is further reflected in each decoupling rib 25 to form a narrow groove 29. The decoupling ribs further support the shoulder ribs by contacting the supporting surface as well as the shoulder ribs when the tire contacts the supporting surface in the footprint of the tire.

Figure 1:
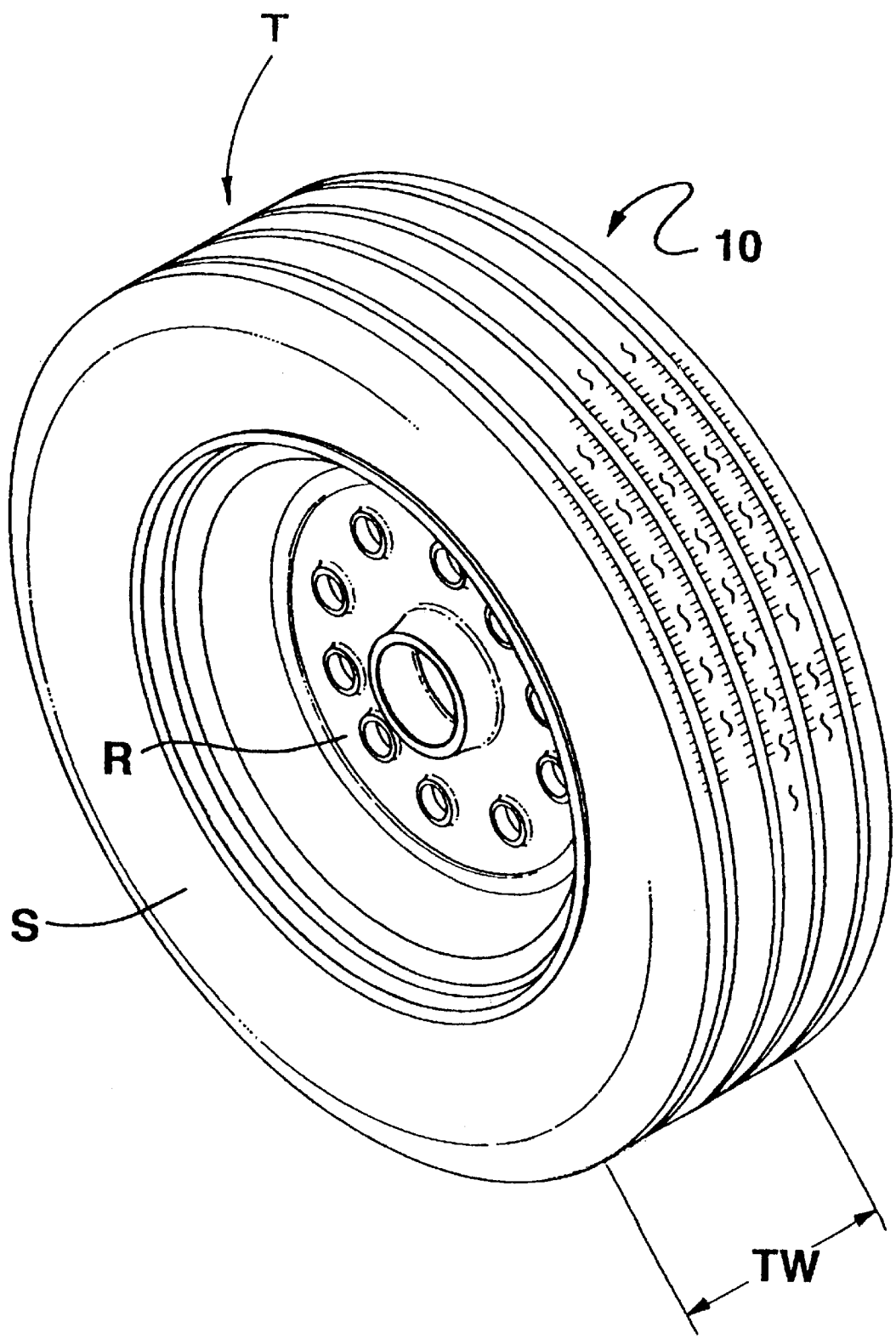
FIG. 1 is a perspective view of a tire having a tread portion of the present invention.

Turning now to FIG. 1, tire 10 is mounted on a rim R and includes sidewalls S and a tread portion T having a tread width TW. Tread portion T of tire 10 comprises a pair of shoulder portions which include associated shoulder ribs and decoupling ribs of unique design.

FIG. 2 is a cross-sectional view of tire 10 which includes a pair of annular beads 11 on opposite sides of a mid-circumferential plane M. Opposite ends of at least one carcass ply 13 anchor with beads 11 while belt plies 15 are positioned radially outward of carcass ply 13 at crown C beneath tread portion T. Tread portion T, which includes shoulder portions 19 merge with the sidewalls S.

A footprint of tread portion T contacts the supporting surface during rolling movement of tire 10. The inner area of tread portion T may include any desired conventional tire tread sculpture features, such as one with inner circumferential grooves 27, and ribs 21. Lateral grooves (not shown), and sipes may also form the tread portion. The particular inner area structure selected is irrelevant to the present invention.

Figure 3:
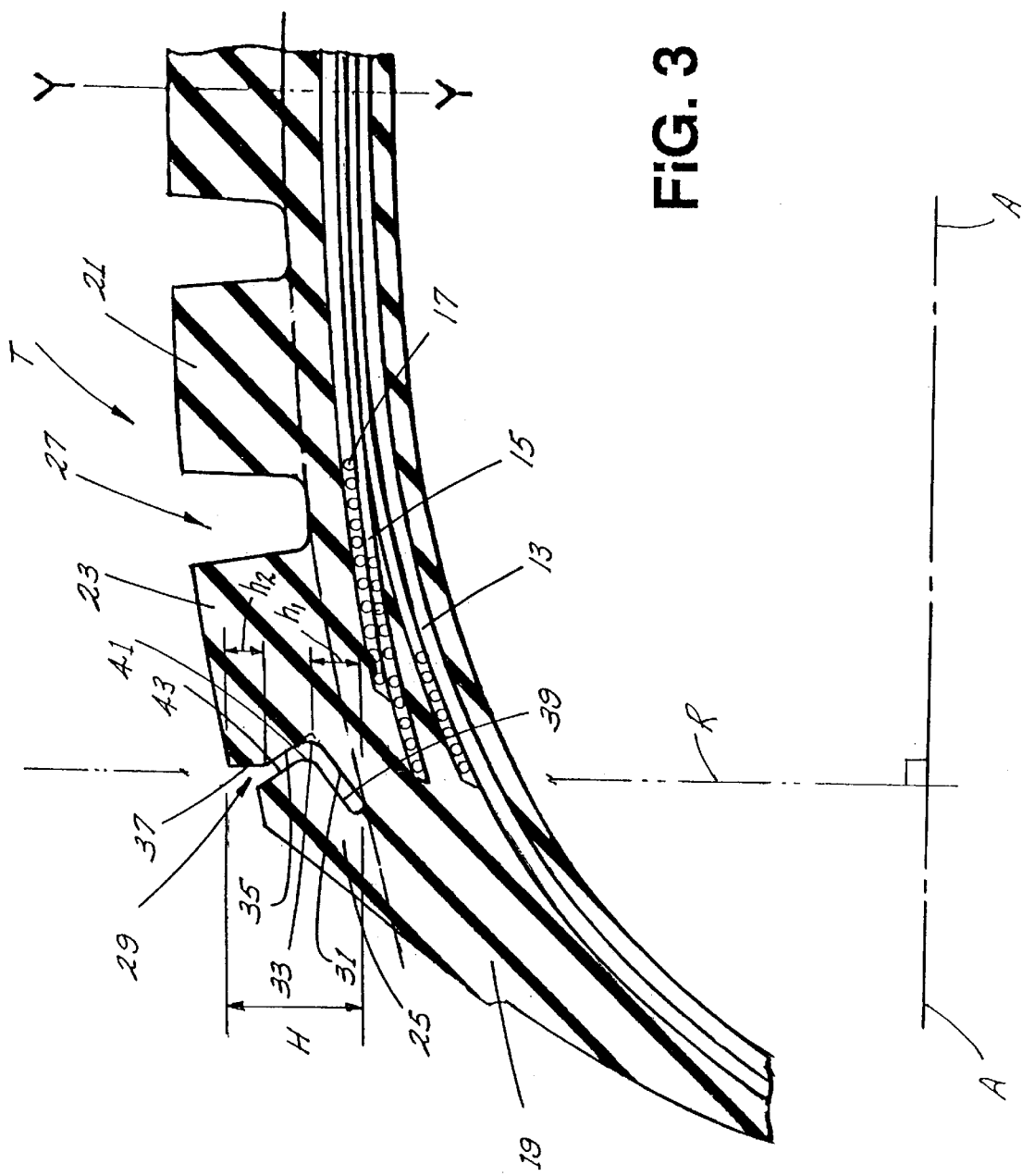
FIG. 3 is an exploded cross-sectional view of the shoulder region of the tire of FIG. 2.
Figure 4:
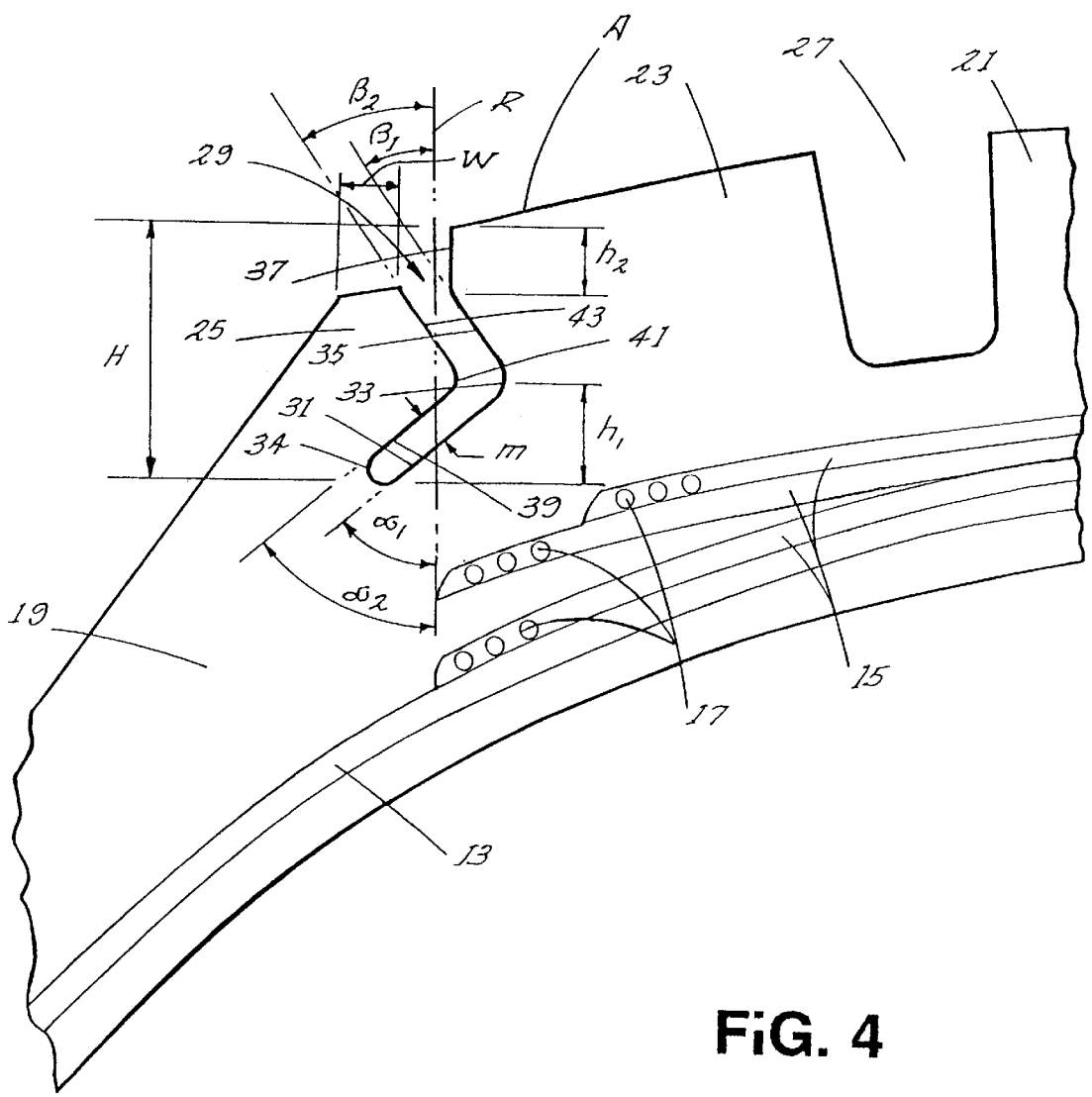
FIG. 4 is an exploded cross-sectional view of a shoulder rib of the tire of FIG. 3.

Each shoulder region 19 of tread portion T is constructed to include a shoulder rib 23 and a decoupling, or sacrificial, rib 25. The desirability of a decoupling rib on the shoulder portion of a tire is discussed in U.S. Pat. No. 4,480,671 to Giron. FIGS. 3 and 4 are cross-sectional views of a shoulder region containing the unique shoulder construction of the invention. Decoupling groove 29 separates decoupling rib 25 and shoulder rib 23. As clearly shown the facing lateral or side surfaces of shoulder rib 23 and decoupling rib 25 are shaped in conforming image to form the uniquely constructed decoupling groove 29 therebetween.

FIGS. 3 and 4 show the actual lateral profile of tread area T and outer surface A of shoulder rib 23. As indicated in the drawings these areas are slightly arcuate and do not extend laterally along a single plane across the tire width. The lateral outer side surface of shoulder rib 23 faces the lateral inner side surface of decoupling rib 25. The lateral outer side of the shoulder rib includes a positively tapered portion 31, transition area 33, negatively tapered portion 35 and substantially straight portion 37. The opposite, or lateral inner side surface of shoulder rib 23 generally conforms with the side surfaces of ribs 21 and is not relevant to the present invention. Grooves 27 separate tread ribs 21 from shoulder ribs 23.

Positively tapered portion 31, which begins at transition or base 34, forms the radially innermost, or proximal, part of the outer side surface of shoulder rib 23. Preferably, positively tapered portion 31 encompasses between 30% and 40% of the total radial height H of shoulder rib 23 with 35% being preferred. In, for example, a long-haul commercial vehicle tire, a shoulder rib can have a total radial height of between approximately 10 and 25 mm. Thus, preferably positively tapered portion 31 encompasses between approximately 3.5 and 8.75 mm of the radial height of shoulder rib 23. Positively tapered portion 31 has a taper angle $\alpha_1$, as shown in FIG. 4. Taper angle $\alpha_1$ is measured from a radial line R extending from the axis of rotation of the tire. Taper angle $\alpha_1$ is between approximately 30 and 60° with the preferred taper angle $\alpha_1$ being approximately 53°.

Negatively tapered portion 35 extends radially outward from transition area 33. Negatively tapered portion 35 encompasses between approximately 30% and 40% of the total radial height of shoulder rib 23 with approximately 35% preferred. In, for example, a long-haul commercial vehicle tire, negatively tapered portion 35 encompasses between approximately 3.5 and 8.75 mm of the radial height H of shoulder rib 23, which is between approximately 10 and 25 mm. Negatively tapered portion 31 has a taper angle $\beta_1$, (see FIG. 4). Taper angle $\beta_1$ is measured from a radial line extending from the axis of rotation of the tire. Taper angle $\beta_1$ is between approximately 20 and 45°. Preferably, taper angle $\beta_1$ is approximately 37°.

Straight portion 37 preferably extends radially outward from negatively tapered portion 35 although it could extend at a slight angle from the radial line or be curved. Straight portion 37 forms the radially outermost, or distal, part of the lateral side of shoulder rib 23; extending the remaining radial height of the shoulder rib and terminating with outer surface A. Preferably, the straight portion 37 extends approximately 30% of the radial height of shoulder rib 23. In, for example, a long-haul commercial vehicle tire, straight portion 37 encompasses between approximately 3 and 7.5 mm of the radial height of shoulder rib 23, which is between approximately between 10 and 25 mm.

Transition area 33 forms a connecting area between positively tapered portion 31 and negatively tapered portion 35. Transition area 33 is preferably rounded to prevent cracking and can have a radius of curvature, for example, of between approximately 1.5 and 3.5 mm. Preferably, the radius of curvature of transition area 33 is approximately 3 mm. In an alternative arrangement transition area 33 does not require a radius of curvature.

The interface between straight portion 37 and negatively tapered portion 35 is also preferably a rounded profile. The rounded profile of the interface between straight portion 37 and negatively tapered portion 35 also helps to prevent cracking on shoulder rib 23.

Decoupling rib (first rib) 25 has a smaller radial height than shoulder rib (second rib) 23 and includes a radially outer or crown surface. The lateral inner side surface of decoupling rib 25 faces the lateral outer side surface of shoulder rib 23. The lateral inner side surface consists of a negatively tapered portion 39, transition area 41 and a positively tapered portion 43. The inner lateral side surface of the decoupling rib has all of the features and is generally formed in conforming image of the lateral outer side surface of shoulder rib 23, save straight portion 37. The lateral outer side surface of decoupling rib 25 is substantially aligned with and merges into shoulder 19 in the usual manner.

Negatively tapered portion 39 which begins at transition or base 34 forms the radially innermost, or proximal, part of the side portion of decoupling rib 25. Negatively tapered portion 39 has a taper angle $\alpha_2$, as illustrated in FIG. 4. Taper angle $\alpha_2$ is measured from a radial line R extending from the axis of rotation of the tire. Transition area 41 is formed between negatively tapered portion 39 and a positively tapered portion 43. Transition area 41 preferably forms a rounded interface between the negatively tapered portion 39 and positively tapered portion 43; which helps prevent cracking of decoupling rib 25. The outer extremity of positively tapered portion 43 aligns with the radially outer, or crown surface of decoupling rib 25. Positively tapered portion 43 has a taper angle $\beta_2$ (see FIG. 4). Taper angle $\beta_2$ is measured from a radial line R extending from the axis of rotation A—A of the tire.

Radial innermost ends of positive and negative tapered portions 31 and 39 respectively are interconnected with a rounded transition area 34 with a radius of curvature of between 2 mm and 3 mm at the bottom of the groove 29.

In the preferred embodiment, the shape of the lateral inner side surface of decoupling rib 25 conforms with the shape of the lateral outer side surface of shoulder rib 23. The inner side surface of decoupling rib 25 is offset from the outer side surface of shoulder rib 23 by a distance M between about 1 mm and 3 mm, as illustrated in FIGS. 3 and 4. This offset may be constant along the length of the groove 29 or may progressively vary. The radially outer surface of decoupling rib 25 is radially offset from the lateral profile of the outer surface A of shoulder rib 23 from between approximately 0% and 20% of the rib height H of tread T. In, for example, a long haul commercial vehicle tire, the radial offset is between approximately 0 and 5 mm and is, preferably, approximately 2.5 mm. Alternatively, the radial outer surface of the decoupling rib 25 could be offset from the lateral profile of the outer surface A an amount up to 40% of the rib height H of tread T.

In order for the inner side surface of decoupling rib 25 to follow the shape of the laterally outer side surface of shoulder rib 23, taper angle $\alpha_2$ should approximately equal taper angle $\alpha_1$; and taper angle $\beta_2$ should approximately equal taper angle $\beta_1$. According to a preferred embodiment, the taper angles $\alpha_1$ and $\alpha_2$ are also equal to taper angles $\beta_1$ and $\beta_2$. More preferably, the equal angles are in the range of 30° to 60° relative to the radial direction.

Preferably, decoupling rib 25 has a lateral width W of approximately 30% of the tread height H of tire 10 at the radial outer surface of decoupling rib 25. Thus, in, for example, a long-haul commercial tire, the lateral width of decoupling rib 25 at its radially outermost extent is between approximately 3 and 7.5 mm. The lateral width of decoupling rib 25 can be adjusted by radially positioning the radially outermost extent of its outer surface. The lateral outer surface of decoupling rib 25 extends radially inward at an acute angle with respect to the radial axis R and merges with sidewall S.

Straight portion 37 is provided to strengthen the radial outer surface of the shoulder rib 23 to resist tearing or cutting the lateral edge of shoulder rib during use of tire 10. Straight portion 37 also assists in providing the lateral stability to shoulder rib 23 and reducing its tendency for wear due to scrubbing.

Groove 29 has a lateral outward slant near its base 34 to provide for an increased base area for shoulder rib 23 adjacent the edge of belt 15. This increased base area provides increased strength between the base of the groove and the edge of the belt and further prevents cracking at the bottom of the groove.

Groove 29 is designed to reduce the radial rigidity of the lateral outer portion of shoulder rib 23. This reduces the normal stress against the footprint on the lateral outer surface of the rib to be substantially equal to the average radial stress distribution on the rib, as shown in the graph N2 of normal stresses of FIG. 7. This equalization of stress brings about an equalization of wear laterally across the outer surface of shoulder rib 23 which reduces the formation of anomalies. A graph N1 of normal stresses for a tire with conventional shoulder grooves is illustrated in FIG. 6.

Figure 6:
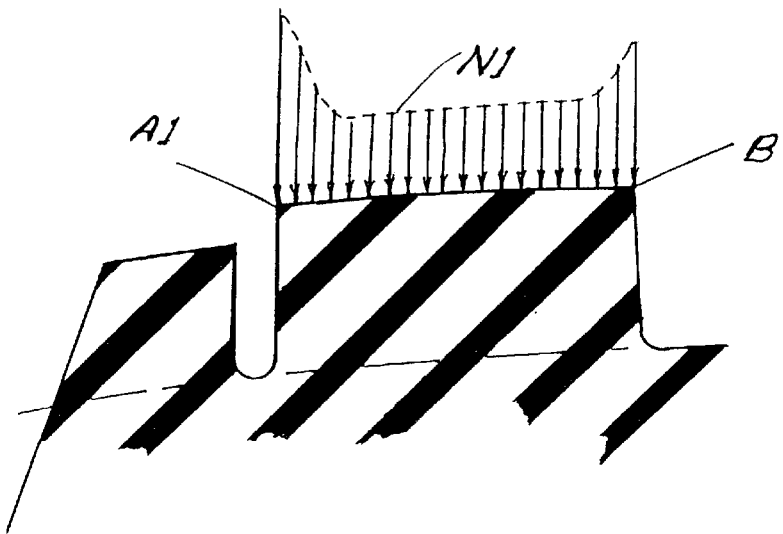
FIG. 6 is a schematic view showing nominal radial pressure across a conventional shoulder rib at the footprint; and, FIG. 7 is a schematic view showing the radial pressure across the shoulder rib of the invention at the footprint.

Turning now to FIG. 6, graph N1 depicts the radial or normal pressure at the footprint of a conventional tire of normal tread construction across or laterally of shoulder rib 23' under nominal inflation pressure and load. As shown, by the graph, normal pressure at the outer edge A1 of the surface of the rib is greater than the radial pressure along the central area of the rib and somewhat greater than the pressure at inner edge B, as shown by graph N1. This radial pressure at edge A1 helps create accelerated wear in this area. The excessive normal pressure may also causes chunking along rib edges. These phenomenons cause anomalies to form along outer edge A1.

Figure 7:
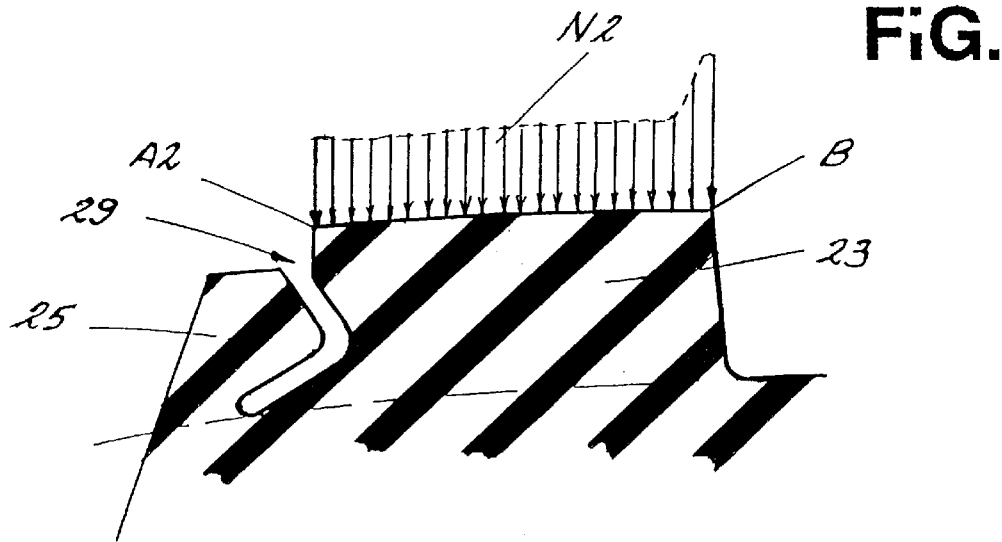

FIG. 7 shows a shoulder construction generally defining the structure of the invention in which edge A2 of rib 23 has been under cut by the design configuration of groove 29. The structure of groove 29 reduces the radial stiffness of the shoulder rib at edge A2, which reduces the normal pressure on the outer rib surface at the footprint to be substantially constant from edge A2 to just before edge B as shown by graph N2. The reduced pressure helps to relieve accelerated wear and the formation of anomalies along edge A2 under nominal operating conditions. Therefore, the groove 29 configuration of this invention reduces the normal pressure on the shoulder rib at edges A2 of the tire's footprint.

Figure 5:
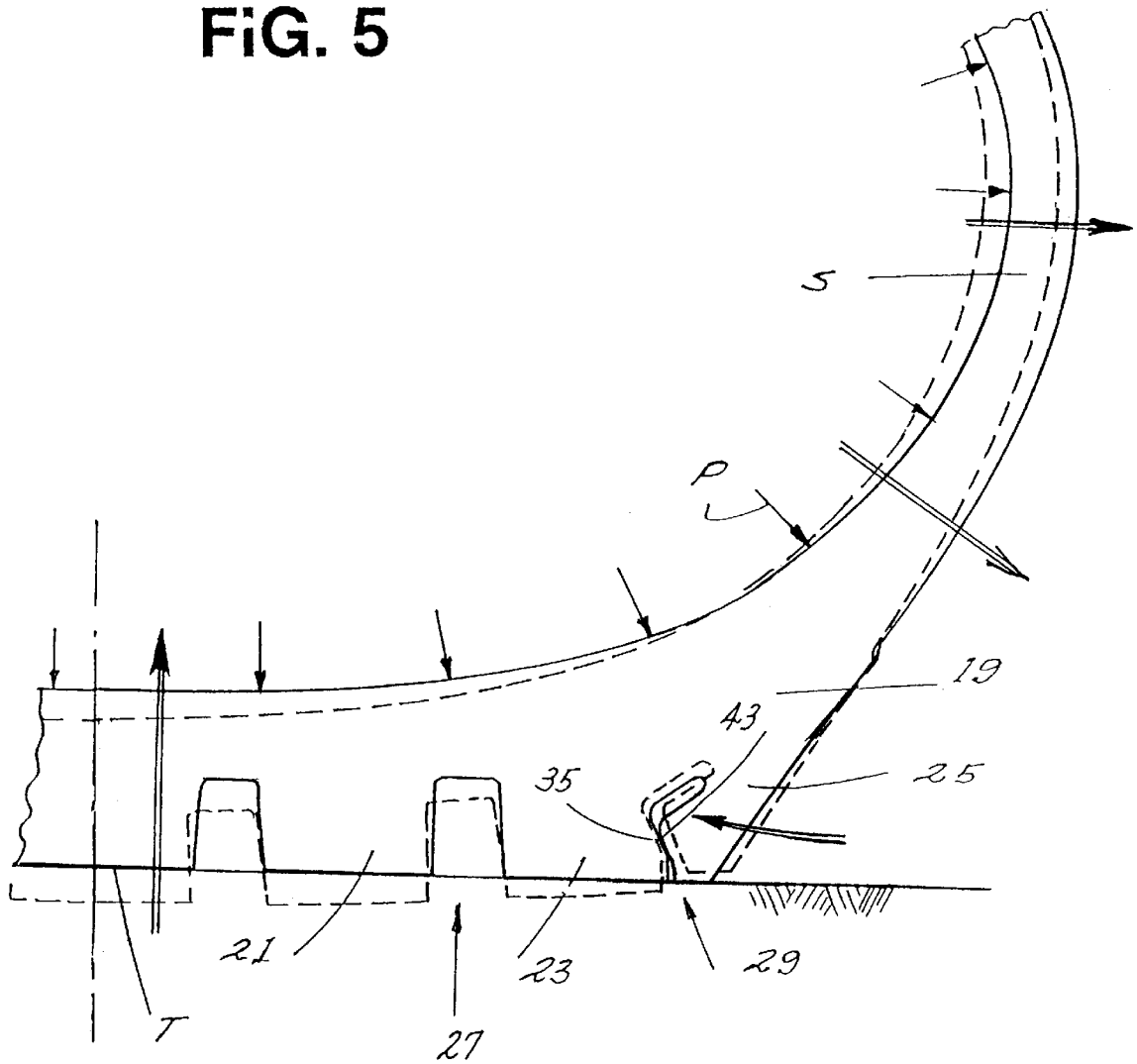
FIG. 5 is an exploded cross-sectional view similar to FIG. 3 showing the effect on the tread and sidewall of the tire from normal weight and pressure above the footprint.

In all areas except the area in contact with the supporting surface (footprint), the contour of the tire under nominal inflation pressure appears substantially as shown in FIG. 2 with sides S and tread T extending along arcuate paths. Grooves 29 and 27 are shown in their normal open conditions. When the tread surface makes contact at the footprint the configuration of the tire changes drastically, as illustrated in FIG. 5. Sides S of the tire are forced outwardly and downwardly in the direction of the arrows from the position shown in dashed lines to the position shown in solid lines. Tread T of the tire is moved inwardly from its normal arcuate configuration shown in the dashed lines into the substantially horizontal position shown in solid lines. It can also be seen that ribs 21 and shoulder rib 23 are compressed narrowing grooves 27 and 29 and moving surface 35 laterally outwardly a slight amount. The configuration and the movement of sides S laterally outwardly and downwardly and the movement of tread T inwardly allows decoupling rib 25 of shoulder 19 to move radially and laterally inwardly, bringing side face 43 into contact with side face 35 of shoulder rib 23. Also, the radial outer surface of decoupling rib 25 is brought into contact with the support surface. At least a portion of groove 29 is now closed to help support the shoulder rib and further improve the stresses on the shoulder ribs.

The configuration of groove 29 provides reduced normal stress of the outer portion of outer surface A of shoulder rib 23 while the engagement between side faces 35 and 43 provides increased lateral stability to the outer side surface of shoulder rib 23 during straight ahead rolling of the tire. During turns, in which increased lateral stress is applied against the shoulder rib 23 and the decoupling rib, the decoupling rib. The decoupling rib 25 is moved even further than depicted in FIG. 5 causing groove 29 to further close and increase the lateral support. In the above described relative positions, decoupling rib 25 in combination with the configuration of groove 29 provides increased lateral stability and reduced radial stress of the lateral outer edge of shoulder rib 23 along its height providing a higher degree of lateral support for the shoulder rib.

In use, the configuration of tire 10 continuously alternates between the configuration shown in FIG. 2 to that shown in FIG. 5 so that at the footprint, shoulder rib 23 is always provided additional lateral and radial support. The additional lateral support combined with the reduction of radial stress along the outer area of the outer surface of the shoulder rib prevent abnormal deformation and excessive wear of the shoulder rib.

The above description is given in reference to the preferred embodiment of a tire having a tread portion for reducing the formation of anomalies causing subjective user dissatisfaction. However, it is understood that many variations are apparent to one of ordinary skill in the art from a reading of the disclosure of the invention. Such variations and modifications apparent to those skilled in the art are within the scope and spirit of the instant invention as defined by the following appended claims.

What is claimed is:

1. A tire having a pair of beads, a carcass ply having ends, each of the ends anchored to a respective one of the beads, at least one belt ply extending circumferentially around the tire and disposed radially outward of the carcass ply, and a tread disposed radially outward of the at least one belt ply, the tire having a tread shoulder comprising:

a first decoupling rib at an axially outermost extent of the tread and having a radially outward crown surface; and a second rib axially inwardly adjacent the first rib and having a radially outward crown surface;

the first and second ribs being separated by a groove, the groove being formed with, from radially outward, a first portion directed radially and axially inward to undercut the second rib and a second portion directed radially inward and axially outward to undercut the first rib, wherein the second rib has an axially outward facing surface having a first radially directed portion, a second negatively tapered portion, and a third positively tapered portion, wherein the crown surface of the first rib is recessed radially from a height profile defined by the crown surface of the second rib, and, wherein, when the tire is in ground contact under a nominal inflation pressure and a nominal load, the crown surface of the first rib contacts the ground and a surface of the first rib defined by the groove contacts the axially outward facing surface of the second rib to support the second rib.

2. The tire as claimed in claim 1, wherein the second portion of the groove is an angle of 30° to 60° relative to the radial direction.

3. The tire as claimed in claim 1, wherein the first portion of the groove is at an angle of 20° to 45° relative to the radial direction.

4. The tire as claimed in claim 1, wherein the first portion and the second portion of the groove are at angles relative to the radial direction having the same absolute value.

5. The tire as claimed in claim 4, wherein the angles of the first portion and second portion have an absolute value between 30° and 60°.

6. The tire as claimed in claim 1, wherein the crown surface of the first rib is recessed not more than 40% of the radial height profile.

7. The tire as claimed in claim 6, wherein the crown surface of the first rib is recessed not more than 20% of the radial height profile.

8. The tire as claimed in claim 1, wherein the first radially directed portion of the second rib is approximately 30% of the radial height of the second rib and the negatively tapered and positively tapered portions of the second rib are each approximately 35% of the radial height of the second rib.

9. The tire as claimed in claim 1, wherein the crown surface of the first rib has an axial width approximately 30% of a thickness of the tread.

10. The tire as claimed in claim 1, wherein the groove has a width that progressively varies along a length of the groove.

11. The tire as claimed in claim 1, wherein the groove has a width of 1 mm to 2.5 mm.

* * * * *